(12) United States Patent
Cass et al.

(10) Patent No.: US 7,101,296 B1
(45) Date of Patent: Sep. 5, 2006

(54) SYNCHRONOUS REAR BELT DRIVE SYSTEM FOR MOTORCYCLES AND METHOD OF USE

(75) Inventors: Richard F. Cass, Claremont, NH (US); Andrew O. Law, Heath, MA (US)

(73) Assignee: Sonnax Industries, Inc., Bellows Falls, VT (US)

( * ) Notice: Subject to any disclaimer, the term of this patent is extended or adjusted under 35 U.S.C. 154(b) by 348 days.

(21) Appl. No.: 10/201,142

(22) Filed: Jul. 24, 2002

(51) Int. Cl.
*F16H 55/00* (2006.01)

(52) U.S. Cl. ........................... 474/152; 474/148
(58) Field of Classification Search ........... 474/148, 474/152, 153, 162, 174, 176; 74/411
See application file for complete search history.

(56) References Cited

U.S. PATENT DOCUMENTS

| | | | | |
|---|---|---|---|---|
| 3,033,050 A | | 5/1962 | Hisserich | 74/229 |
| 3,439,551 A | * | 4/1969 | Militana | 474/162 |
| 3,541,871 A | * | 11/1970 | Burrell | 74/447 |
| 4,078,445 A | * | 3/1978 | Kiser, Jr. | 474/150 |
| 4,131,032 A | * | 12/1978 | Warland et al. | 74/449 |
| 4,486,183 A | * | 12/1984 | Posiviata et al. | 474/94 |
| 4,585,087 A | * | 4/1986 | Riccitelli | 180/230 |
| 5,209,705 A | | 5/1993 | Gregg | 474/204 |
| 5,421,789 A | | 6/1995 | Gregg | 474/153 |
| 6,264,575 B1 | * | 7/2001 | Lim et al. | 474/77 |
| 2002/0119854 A1 | * | 8/2002 | Mohr et al. | 474/237 |

* cited by examiner

*Primary Examiner*—Vicky A. Johnson
(74) *Attorney, Agent, or Firm*—Clifford F. Rey

(57) ABSTRACT

A synchronous rear belt drive system for belt driven motorcycles and a method of altering the final drive ratio of such motorcycles utilizing the present rear belt drive system is disclosed. The present rear belt drive system provides a plurality of interchangeable sprocket rings, which are assembled on a universal center hub. The selectively interchangeable sprocket rings include different dimensional characteristics and tooth configurations, which produce a wide range of final drive ratios. In one embodiment the front sprocket rings, rear sprocket and drive belt include two rows of obliquely angled teeth that prevent axial movement of the drive belt and permit a narrower belt, reduced sprocket weight, and increased horsepower. In an alternative embodiment the interchangeable sprocket rings include a single, annular row of straight teeth that are compatible with the original equipment rear sprocket and belt and also function to reduce sprocket weight and increase horsepower.

10 Claims, 11 Drawing Sheets

SYNCHRONOUS REAR BELT DRIVE SYSTEM FOR MOTORCYCLES AND METHOD OF USE

BACKGROUND OF THE INVENTION

The present invention relates to motorcycle drive trains and, more particularly, to a synchronous rear belt drive system for belt driven motorcycles and a method of altering the final drive ratio of such motorcycles utilizing the present rear belt drive system.

Synchronous drive belts are used extensively in industry and in the automotive industry as timing belts for driving camshafts and auxiliary components on engines. These are endless belts upon which teeth are molded for engagement with matching cavities formed in a pulley or sprocket providing a synchronous drive system.

Conventional synchronous drive belts have teeth disposed at right angles to the mid-circumferential plane of the belt. In such belt drives each individual tooth engages a corresponding pulley cavity in a manner analogous to a rack and pinion gear. This engagement results in some impact between the belt and pulley and causes air to be suddenly expelled from the pulley cavity resulting in noise.

Various efforts have been made to increase the efficiency and to reduce noise produced by such synchronous belt/pulley combinations. For example, U.S. Pat. No. 3,033,050 illustrates a belt/pulley combination wherein the belt has teeth in a so-called herringbone design to center the belt over a V-shaped pulley in order to preclude axial movement of the belt on the pulley.

U.S. Pat. No. 5,209,705 discloses a synchronous drive belt with oblique and offset teeth having at least two adjacent rows of teeth which are at oppositely balanced oblique angles to the longitudinal direction of the belt. In addition the centerlines of the teeth in the adjacent rows are offset from each other by a distance of up to 10% to 90% of their pitch. Similarly, U.S. Pat. No. 5,421,789 discloses a synchronous drive pulley having pulley cavities, which are complimentary to a synchronous drive belt that has at least two adjacent rows of obliquely angled teeth.

However, there is no teaching or suggestion that these inventions have application in the motorcycle arts and in the manner of the present invention.

SUMMARY OF THE INVENTION

Accordingly, the present invention proposes the use of a synchronous belt/sprocket drive system including obliquely angled, offset teeth to replace the conventional rear belt drive currently utilized on many belt driven motorcycles. The present belt drive system provides a plurality of interchangeable pulleys or sprocket rings, which are assembled on a universal center hub. The selectively interchangeable sprocket rings produce a wide range of final drive ratios for different motorcycle applications. In addition, the present sprocket rings are fabricated from aluminum, which decreases weight and increases horsepower. The obliquely angled, offset tooth design also provides for noise reduction and permits the use of a narrower sprocket and belt which, in turn, allows the installation of a wider tire on the stock rear axle.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Those skilled in the art will appreciate that the conception upon which this disclosure is based may readily be utilized as a basis for the designing of other structures, methods, and systems for carrying out the purposes of the present invention. It is important, therefore, that the claims be regarded as including such equivalent constructions insofar as they do not depart from the spirit and scope of the present invention.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Prior to describing the present invention in detail it may be beneficial to review the structure and function of the rear belt drive system of a motorcycle. With reference to the drawings there is shown therein such a rear belt drive system for a conventional motorcycle, indicated generally at 100. The rear belt drive system 100 is basically comprised of a rear sprocket, indicated generally at 110, a front sprocket, indicated generally at 120, and a drive belt, indicated generally at 130.

Figure 1:
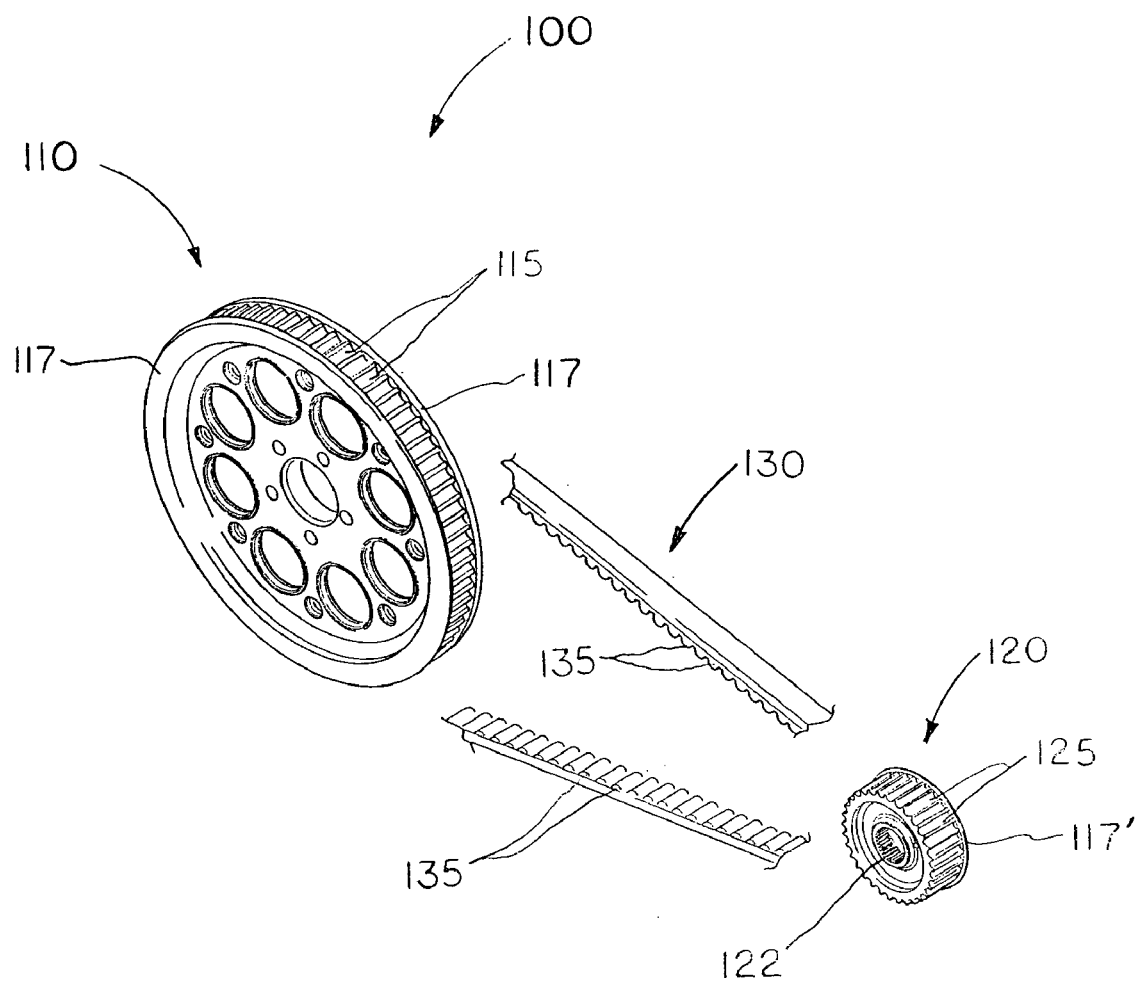
FIG. 1 is a partially cutaway, perspective view of a rear belt drive system for a motorcycle labeled Prior Art.

In the conventional design the rear sprocket 110 and the front sprocket 120 each include a single, annular row of cavities 115, 125 respectively formed in perpendicular relation to the circumferential mid-plane of the sprockets 110, 120 and about the circumference thereof at regular intervals as shown in FIG. 1. The cavities 115, 125 are adapted for engagement with complimentary teeth 135 formed in the belt 130.

The front sprocket 120 includes an internal spline 122 for mating engagement with the output shaft 230 (see FIG. 5B) of the motorcycle. The rear sprocket 110 is mechanically attached to the rear wheel (not shown) with a plurality of fasteners such as machine screws.

Figure 2:
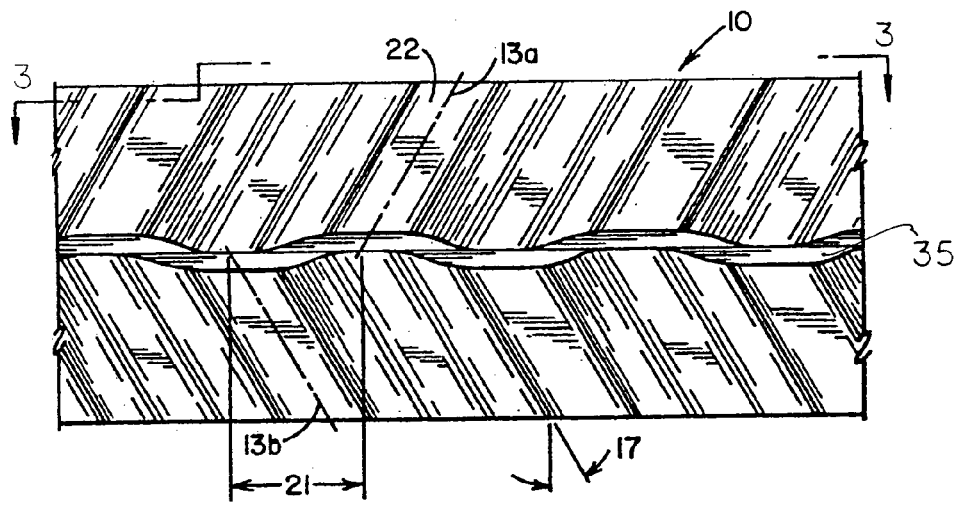
FIG. 2 is a plan view of a portion of a synchronous drive belt utilized with the present invention and labeled Prior Art.

The present invention proposes the replacement of the conventional rear belt drive 100 (FIG. 1) utilized on various motorcycles with a synchronous rear belt drive system including a drive belt, indicated generally at 10, of the type having at least two adjacent rows of obliquely angled, offset teeth 13 as shown in FIG. 2. Teeth 13 are complimentary to cavities 26 formed in mating front and rear sprockets of the type illustrated in FIGS. 4A and 4B.

The present drive belt system utilizes a drive belt 10, which is made of a resilient elastomer and reinforced with a longitudinal tensile member 11 (FIG. 3) that lies along the pitch line 12 and is made up of a plurality of cords of elastic materials suitable for such belts. The tooth surface may, if required, be reinforced with an abrasion resistant fabric 29, such as nylon or other similar material.

The belt 10 includes at least two transversely adjacent rows of teeth 13 having centerlines 13a and 13b. Teeth 13 are uniformly spaced apart in the longitudinal direction by their pitch P and extend obliquely to the longitudinal direction such that the teeth 13 in the transversely adjacent rows are at oppositely balanced angles 17 and the centerlines 13a and 13b are offset from each other by a distance 21 of from 10% to 90% of the pitch P. The oblique angle 17 can range from 15 degrees to 45 degrees.

Figure 3:
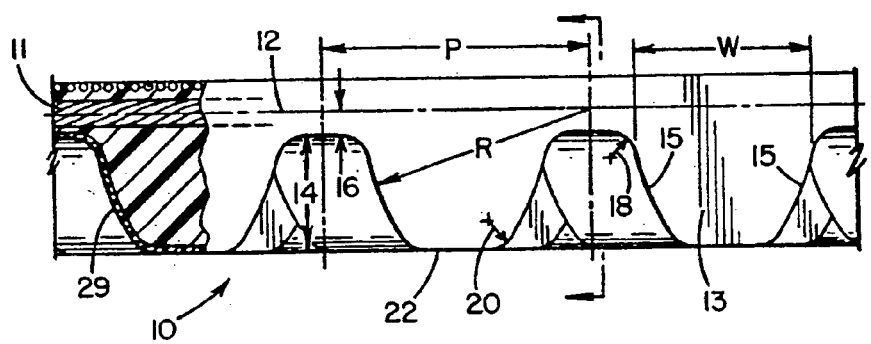
FIG. 3 is a cross-sectional view of the drive belt taken along section line 3—3 of FIG. 2.

As shown in FIG. 3 each tooth 13 has fore and aft flank surfaces 15, 15 that describe an arc having a radius R whose center is illustrated at the junction of the pitch line 12 and midway between adjacent teeth. The length of the radius R is about 70% to 90% of the pitch P. The width of the tooth W is determined by the length of the radius R and its center point. The belt tooth height 14 is about 30% to 55% of the pitch P. To provide smooth transitions between the belt flanks 15 and the land area defined as the surface between the teeth, a belt tooth radius 18 is provided. The belt tooth tip radius 20 provides a smooth transition between the belt flank 15 and the belt tooth tip 22. While not necessary, it is useful to construct the belt such that the adjacent rows of teeth 13 are separated by a gap 35 in order to reduce frictional disengagement from the sprocket cavities 26 (FIG. 4B).

Figure 4A:
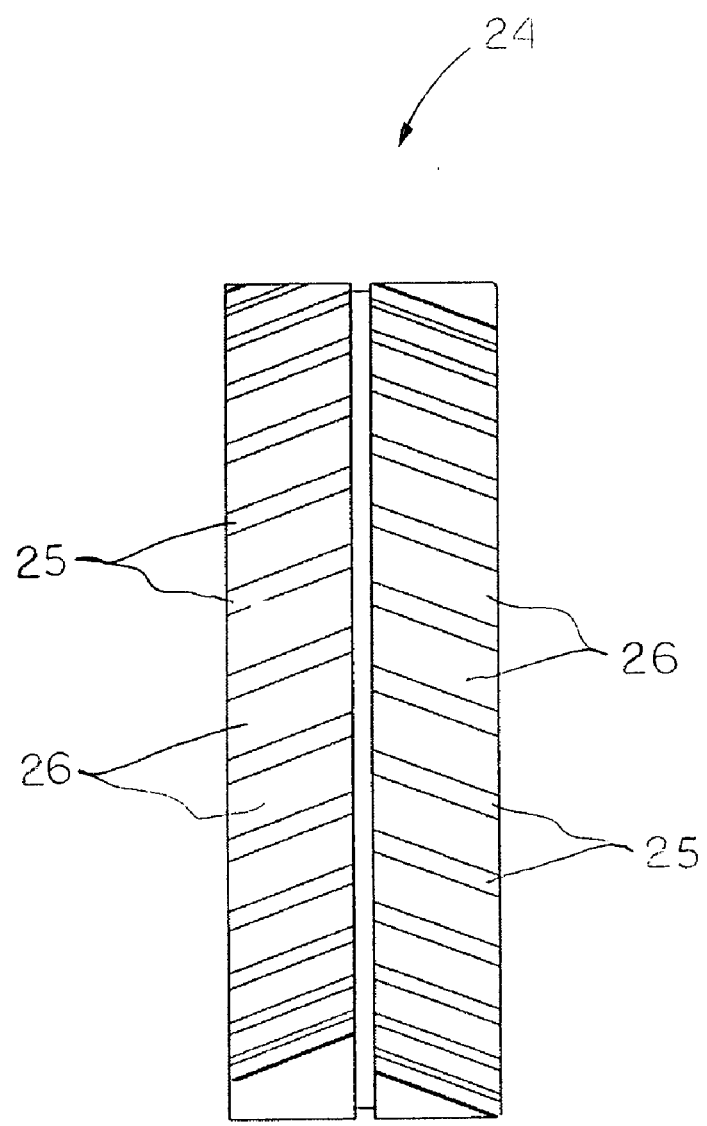
FIG. 4A is a plan view of a sprocket illustrating a helical offset tooth pattern suitable for use with the present invention and labeled Prior Art.
Figure 4B:
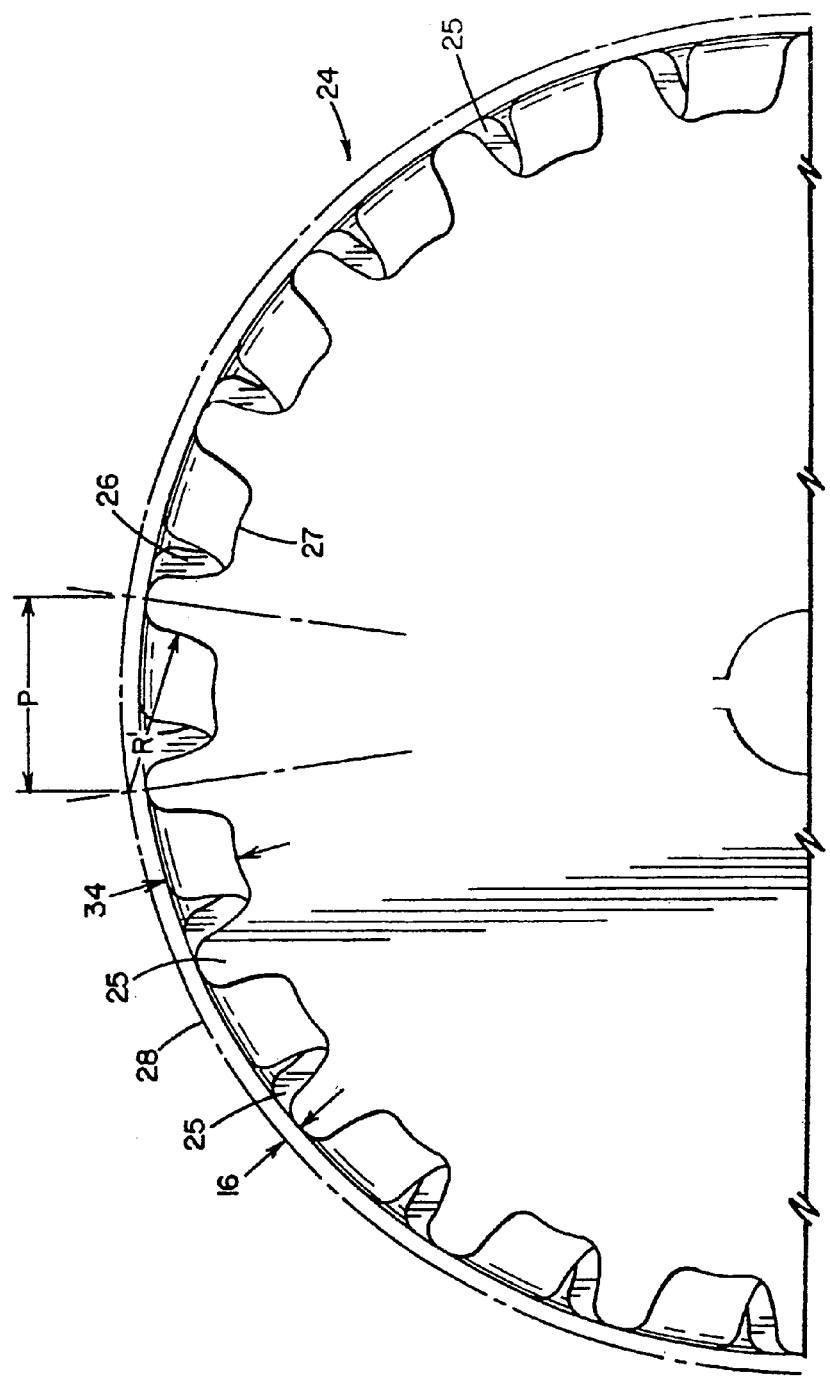
FIG. 4B is an enlarged side view of a portion of the sprocket of FIG. 4A showing details thereof and labeled Prior Art.

Referring to FIGS. 4A and 4B both the front/rear sprockets in the present belt drive system have a plurality of complimentary teeth 25 evenly spaced apart by their pitch P. The space between the teeth 25 defines the cavity 26 having a cavity base 27 (FIG. 4B). The cavity 26 has fore and aft flank surfaces which describe an arc having a radius R' that is equal to or greater than the belt tooth flank radius R. The cavity depth 34 can be from 85% to 105% of the belt tooth depth 14. The center of the radius R' is shown at the intersection of a tooth radial centerline and the pitch circle 28, which defines an imaginary line that is beyond the outer radius of the sprocket tooth by the pitch line differential 16 that corresponds to the distance between the land area between the belt teeth and the pitch line 12.

Figure 5A:
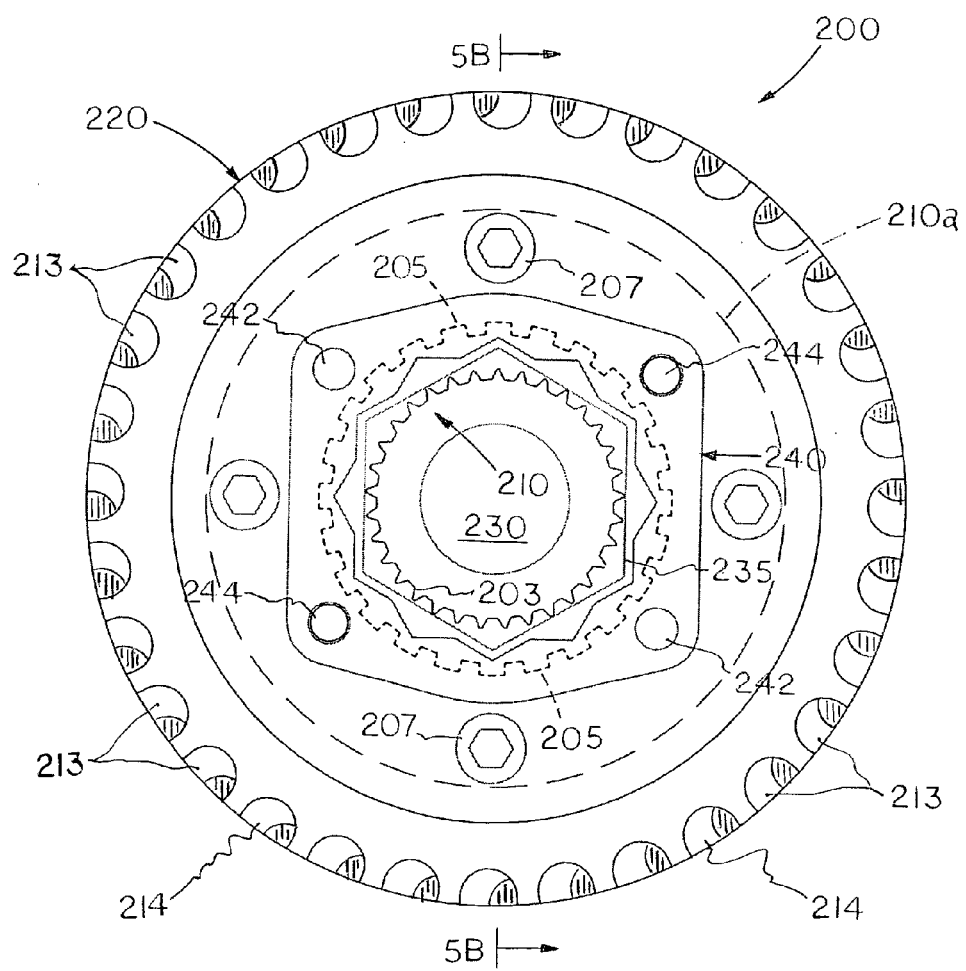
FIG. 5A is an elevational view of a sprocket assembly of the present invention.
Figure 5B:
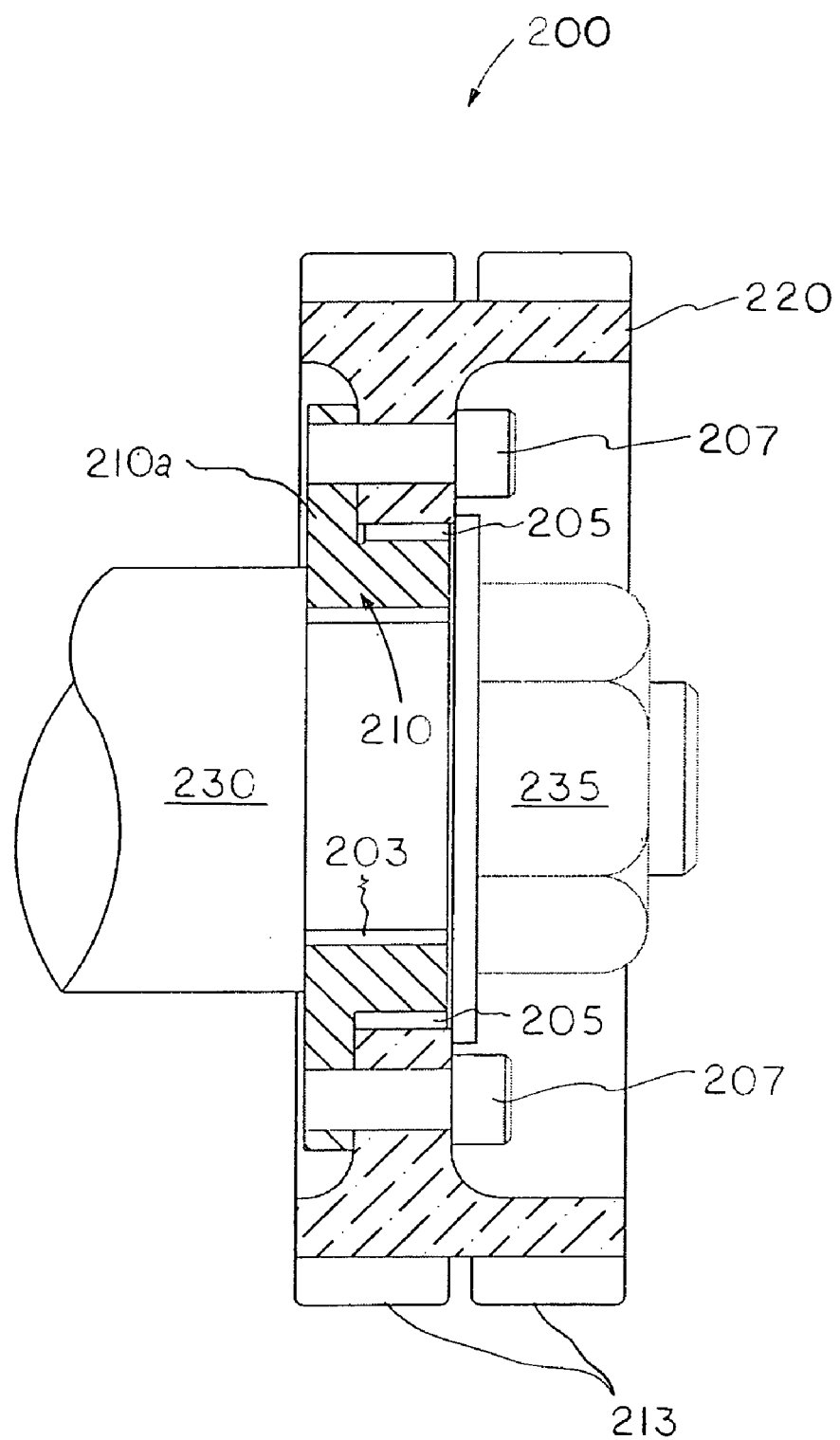
FIG. 5B is a cross-sectional view of the sprocket assembly taken along section line 5B—5B of FIG. 5A.

Referring now to FIG. 5A there is shown therein a sprocket assembly in accordance with the present invention, indicated generally at 200. It will be understood that the present invention and assembly techniques have been developed specifically for the front sprocket of motorcycles employing a rear belt drive system including front and rear sprockets, which engage a transmission output shaft or rear axle having an external spline or modified spline configuration.

As shown in FIG. 5A, the sprocket assembly 200 includes a generally cylindrical center hub, indicated generally at 210, whereon a sprocket ring, indicated generally at 220, having two adjacent rows of helical offset teeth 213, is installed in concentric relation thereto. The spaces between the teeth 213 define two transversely adjacent rows of cavities 214. The configuration of the helical offset teeth 213 formed in the present sprocket ring 220 is substantially the same as described hereinabove in relation to FIG. 4B.

Figure 5C:
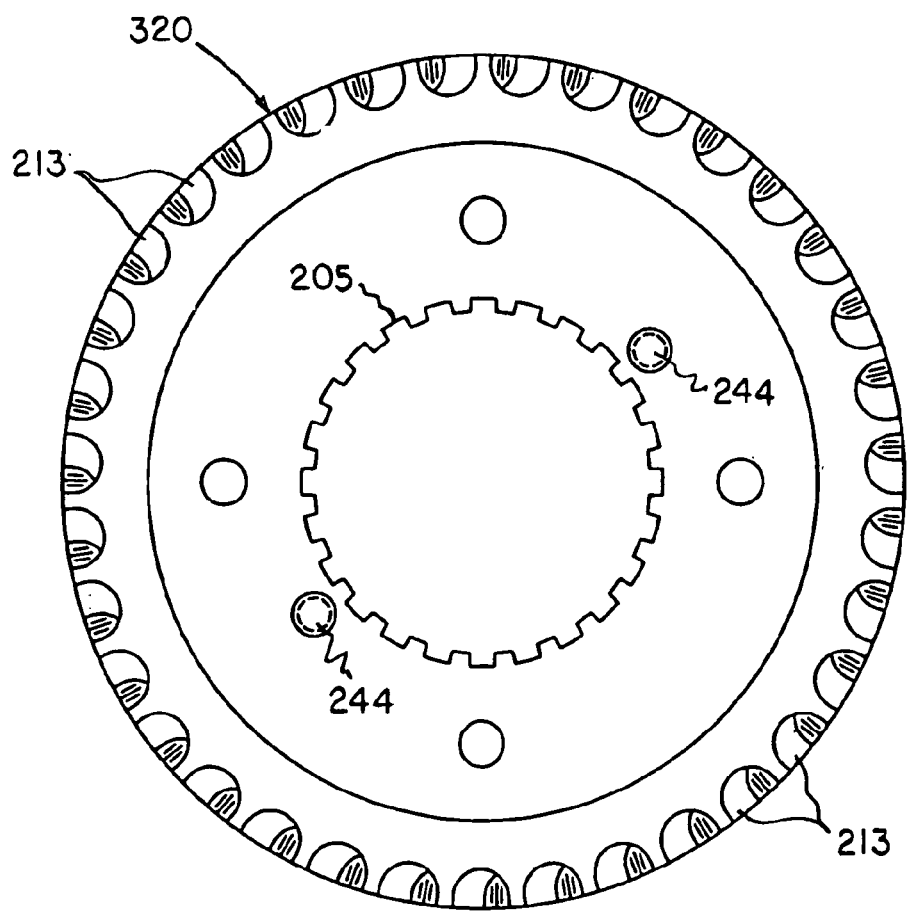
FIG. 5C is an elevational view of an interchangeable sprocket ring having annular rows of obliquely angled teeth.

The present invention includes means for connecting the center hub 210 with a plurality of interchangeable sprocket rings 220, 320 (FIG. 5C) including but not limited to, the following structures. In one embodiment, among others, the center hub 210 and the sprocket ring 220 are connected by sliding engagement of mating internal/external splines at spline interface 205. Machine screws 207 or other suitable fasteners secure the peripheral flange 210a of the center hub 210 to the sprocket ring 220 in concentric relation after the mating internal/external splines are engaged as most clearly shown in FIG. 5B. Alternate machining techniques may be utilized for detachable engagment of the center hub 210 and sprocket rings 220, 320 such as the use of mating serrations (not shown) or modified splines and are considered to be within the scope of the present invention.

In addition, numerous other configurations (i.e. pitch diameter, number of teeth) for the internal spline formed within the bore of the center hub 210 are contemplated for different models and mating shaft applications. Thus, in the present rear belt drive system a plurality of interchangeable center hubs 210 each having a different internal spline can be matched to a given transmission output shaft or rear axle to adapt a selected sprocket ring 220 to a particular motorcycle.

Further, it will be understood that sprocket rings 220, 320 are also provided in a plurality of different helical tooth configurations for selective use in combination with center hub 210 to produce variable final drive ratios for a given motorcycle. More particularly, the helical offset tooth specifications (i.e. tooth pitch, pitch diameter, pitch offset, tooth angle), outside diameter (O.D.), and other dimensional characteristics of sprocket rings 220, 320 are varied to replace the stock sprockets 120, 110 (FIG. 1) currently provided by motorcycle manufacturers, which range from 27 tooth to 70 tooth configurations. By utilizing the present system, the final drive ratio may be selectively modified for the rider's preference or a specialized use of the motorcycle.

In the embodiment shown in FIG. 5A, the center hub 210 is fabricated from hardened steel and is designed for mating engagement at spline interface 203 with an external spline formed on the transmission output shaft 230. The center hub 210 is mechanically attached to the output shaft 230 by a threaded nut 235. Once the nut 235 has been tightened to the required torque, a nut retainer, indicated generally at 240, is installed about nut 235 (FIG. 5A) and fastened to the sprocket ring 220 to prevent rotation of the nut 235 if it is loosened during operation.

The nut retainer 240 is provided with a plurality of openings 242 formed therein for alignment with threaded holes 244 formed in the sprocket ring 220. After the nut retainer 240 is properly positioned, machine screws (not shown) are installed within holes 244 to secure the nut retainer in place.

Sprocket rings 220, 320 are fabricated from a lightweight, durable material such as a high-grade aluminum to reduce weight and to maximize power output to the final drive in comparison to the heavy cast iron sprockets 110, 120 (FIG. 1) of the OEM design. Because the helical offset tooth design functions to center the drive belt 10 over the sprockets 200, axial movement of the belt 10 on the sprockets 200 is precluded during operation. Thus, the lateral flanges 117, 117' formed on the OEM sprockets 110, 120 (FIG. 1) are omitted in the present design providing further weight reduction and increased horsepower.

Figure 6:
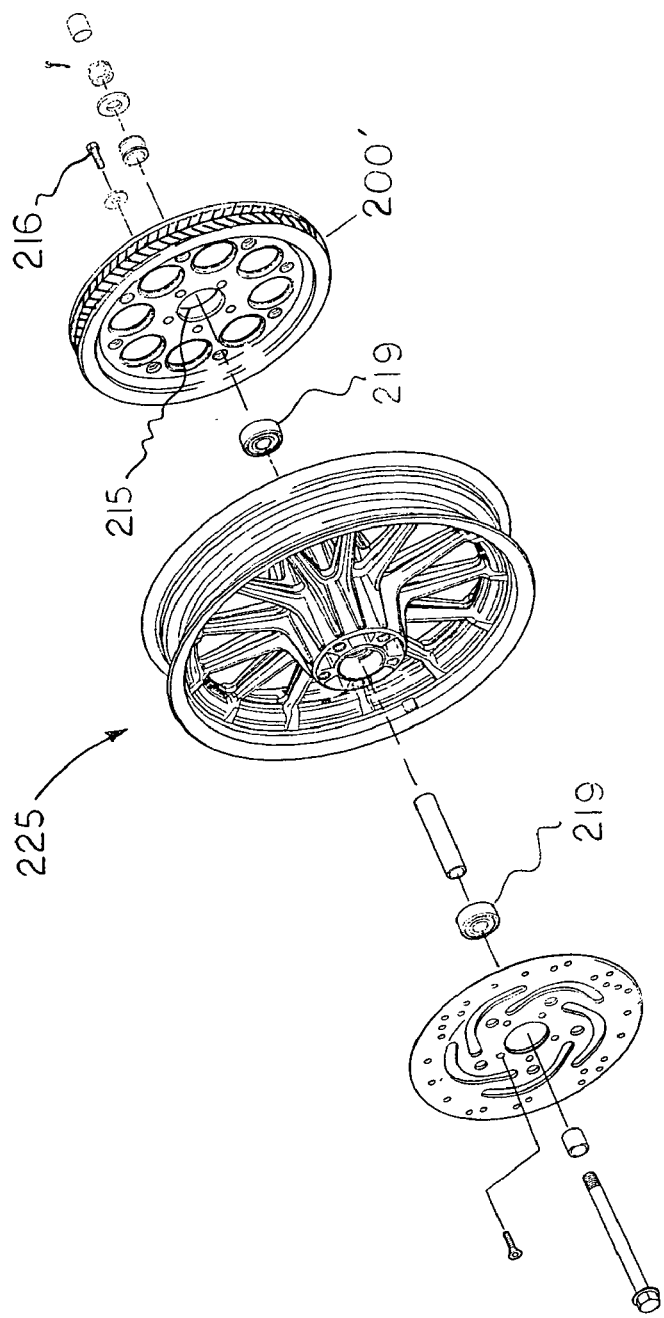
FIG. 6 is an exploded perspective view of the rear wheel assembly of a motorcycle showing the rear sprocket of the present invention.

FIG. 6 illustrates a rear sprocket 250 in accordance with the present invention for a motorcycle rear belt drive system. In the present system the rear sprocket 250 includes a helical tooth configuration as shown compatible with the sprocket ring 220 and belt 10 selected for a desired final drive set-up. It can be seen that the rear sprocket 250 of the motorcycle rear wheel assembly shown in FIG. 6 does not include an internal spline utilizing instead a cylindrical bore 215 wherein a wheel bearing 219 is received. The rear sprocket 250 is mechanically attached to the rear wheel 225 by machine screws 216 and rotates with the rear wheel.

Figure 7A:
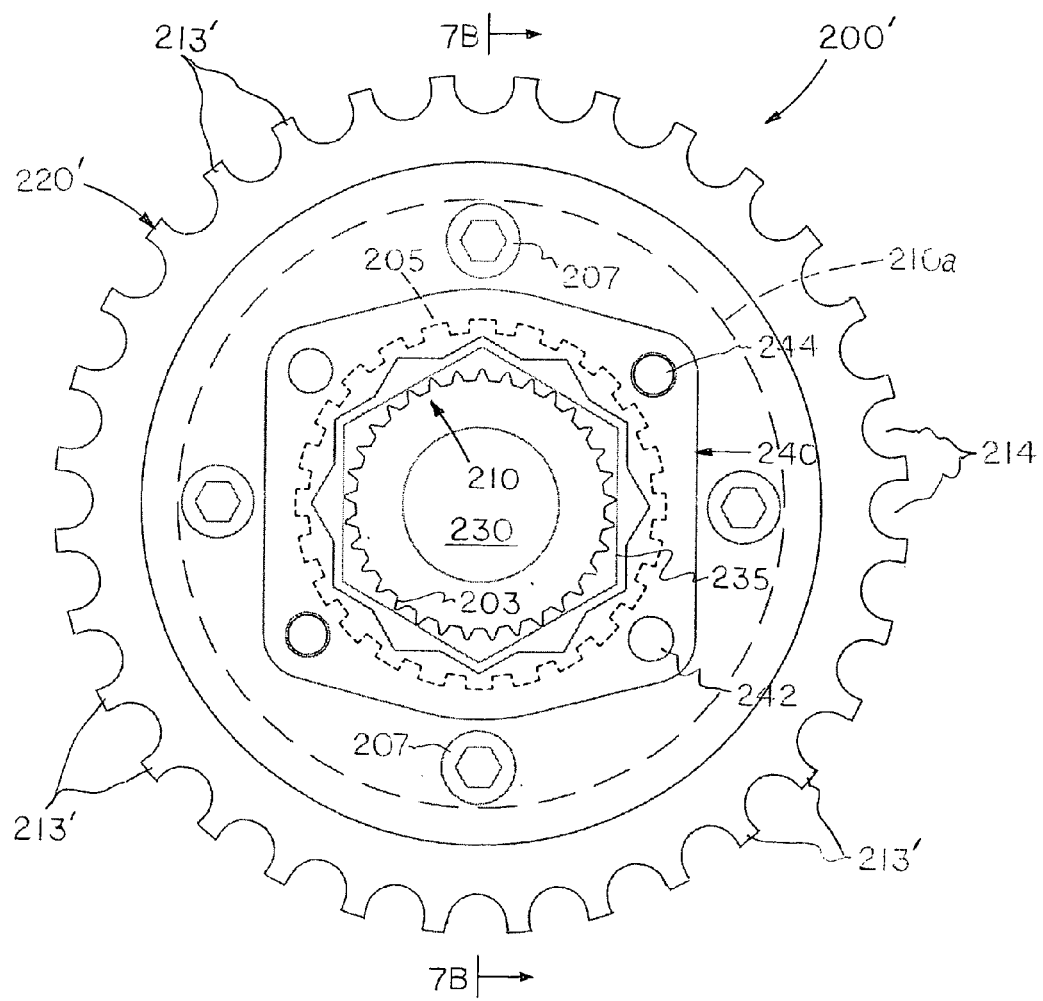
FIG. 7A is an elevational view of an alternative embodiment of the sprocket assembly of the present invention.
Figure 7B:
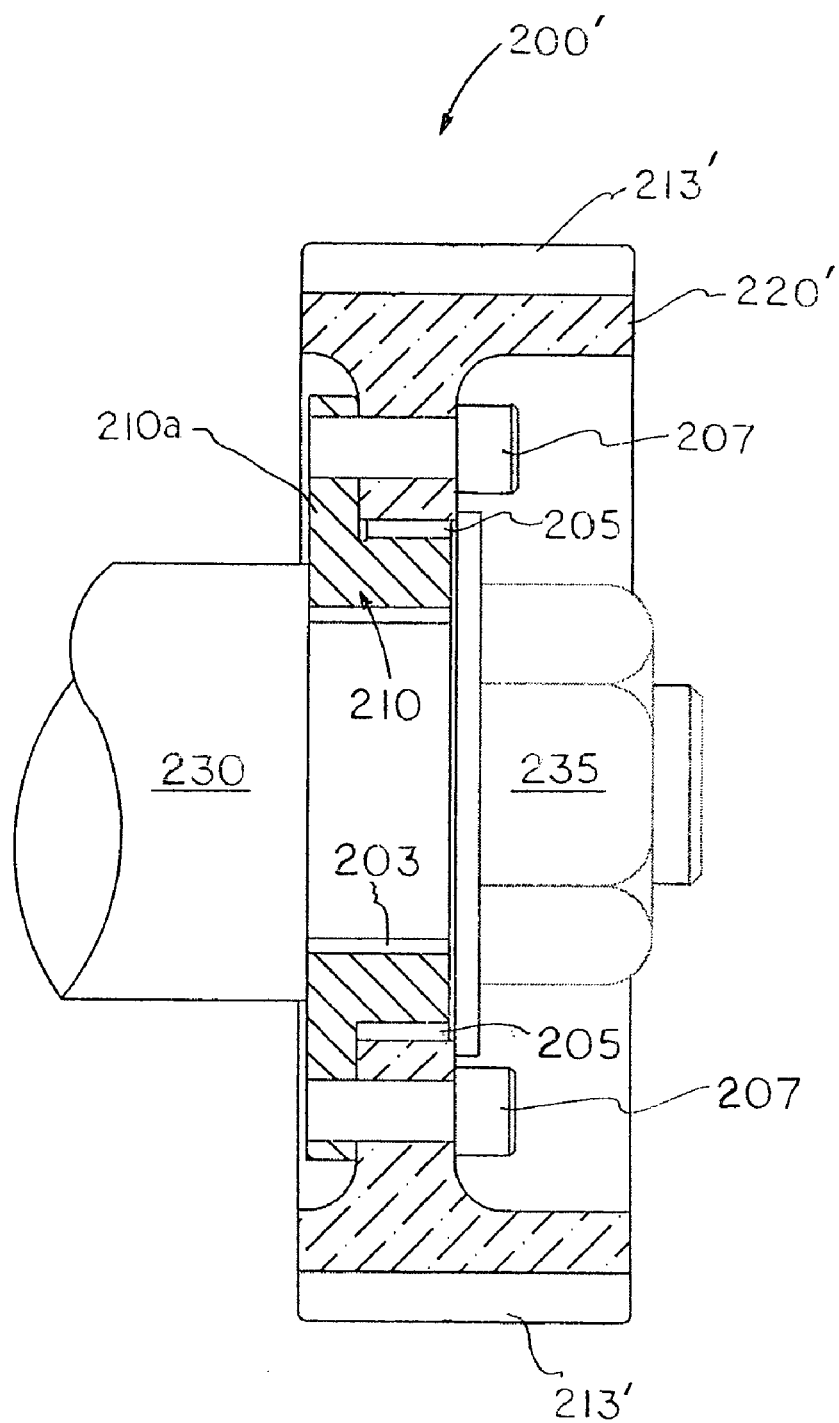
FIG. 7B is a cross-sectional view of an alternative embodiment of the sprocket assembly taken along section line 7B—7B of FIG. 7A.

Although the present invention has been described primarily for use in combination with sprockets 200, 250 and a belt 10 including the helical offset tooth design described hereinabove, it will be appreciated that the present inventive concept can be adapted for use in an alternative sprocket assembly 200' as shown in FIGS. 7A and 7B. In this alternative embodiment sprocket ring 220' includes a single row of transverse teeth 213' uniformly spaced apart in the longitudinal direction wherein the spaces between the teeth define a row of cavities 214' disposed in the longitudinal direction similar to the OEM sprocket design (FIG. 1). Thus, it will be understood that the sprocket assembly 200' shown in FIGS. 7A and 7B is designed for use in combination with an OEM rear sprocket 110 and the OEM belt 130 (FIG. 1).

Figure 7C:
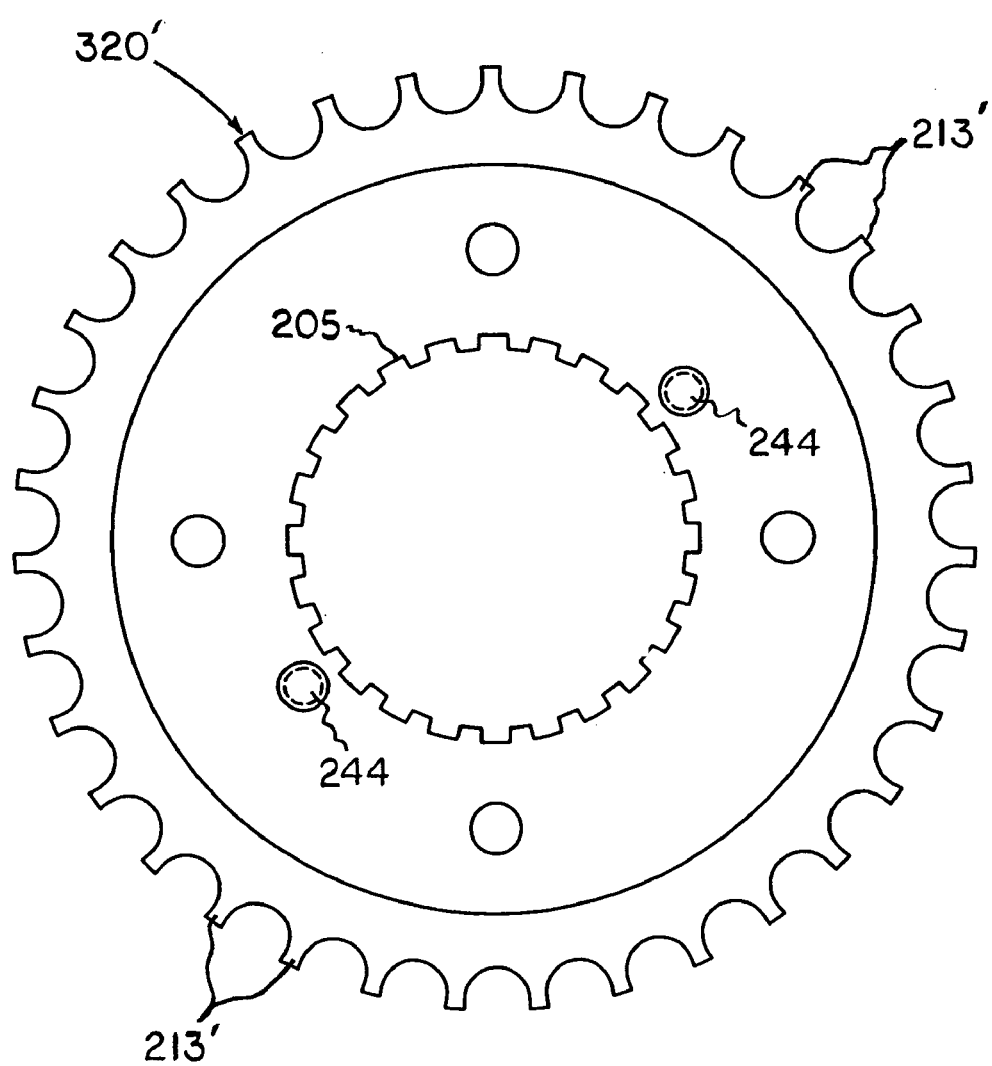
FIG. 7C is an elevational view of an interchangeable sprocket ring having an annular row of teeth disposed in perpendicular relation to the mid-circumferential plane of the sprocket ring.

However, in all other respects the present inventive concept is applicable to the alternative sprocket assembly 200'. That is, the center hub 210 and the sprocket ring 220' are interconnected by sliding engagement of mating internal/external splines at spline interface 205 rendering the sprocket ring 220' interchangeable with other similar sprocket rings 320' (FIG. 7C) having a different number of teeth, tooth pitch, pitch diameter, and/or outside diameter to vary the final drive ratio. Machine screws 207 or other suitable fasteners secure the peripheral flange 210a of the center hub 210 to the sprocket rings 220', 320' in concentric relation after the mating internal/external splines are engaged. In this embodiment at least one lateral flange (not shown) similar to that denoted as 117' in FIG. 1, may be provided on the sprocket rings 220', 320' to prevent axial movement of belt 130 on the sprocket ring during operation.

In the embodiment shown in FIGS. 7A and 7B, the center hub 210 is also fabricated from hardened steel and is designed for mating engagement at spline interface 203 with an external spline formed on the transmission output shaft 230. The center hub 210 is mechanically attached to the output shaft 230 by a threaded nut 235. Similarly, once the nut 235 has been tightened to the required torque, a nut retainer, indicated generally at 240, is installed about nut 235 (FIG. 7A) and is fastened to the sprocket ring 220' to prevent rotation of the nut 235 if it is loosened during operation.

In a similar manner nut retainer 240 is provided with a plurality of openings 242 formed therein for alignment with threaded holes 244 formed in the sprocket ring 220'. After the nut retainer 240 is properly positioned, machine screws (not shown) are installed within holes 244 to secure the nut retainer in place as shown in FIG. 7A.

Sprocket rings 220', 320' are also fabricated from a lightweight, durable material such as a high-grade aluminum to reduce weight and to maximize power output to the final drive in comparison to the heavy cast iron sprockets 110, 120 (FIG. 1) of the conventional design.

The present rear belt drive system is designed as a direct replacement for prior art motorcycle rear belt drive systems. Thus, to install the present belt drive system the standard rear belt drive 100 (FIG. 1) including front sprocket 120, rear sprocket 110, and belt 130 are disassembled and removed from the transmission output shaft 230 and the rear wheel 225. Next, a front sprocket assembly 200 (FIG. 5A) of the present invention is built up by selecting a sprocket ring 220, 320 which will produce the desired final drive ratio for a given motorcycle and a center hub 210 which will engage the selected sprocket ring 220, 320 and fit the external spline on the output shaft 230. Next, the mating splines of the sprocket ring 220 or 320 and center hub 210 are slidingly engaged, and the sprocket ring 220 or 320 and the peripheral flange 210a of the center hub 210 are joined by mechanical fasteners such as machine screws 207. Thereafter, sprocket assembly 200 is installed on the output shaft 230 and nut 235 is advanced and tightened with the required torque. Next, nut retainer 240 is placed over the nut 235, and openings 242 are positioned over threaded holes 244 to permit the installation of machine screws (not shown), which prevents the nut 230 from being loosened during operation.

Next, a rear sprocket 250 having a substantially identical helical tooth configuration is installed on the rear wheel 225 of the motorcycle using mechanical fasteners such as machine screws 216 as shown in FIG. 6. Finally, a drive belt 10 of a predetermined length including a complimentary tooth configuration is installed to surround and engage the front sprocket assembly 200 and the rear sprocket 250.

In an alternative installation procedure the OEM belt 130 is removed and the OEM front sprocket 120 is disassembled and removed from the transmission output shaft 230. The OEM rear sprocket 110 remains in position on the rear wheel 225. Next, a front sprocket assembly 200' is built up by selecting a sprocket ring 220' or 320' which will produce the desired final drive ratio for a given motorcycle and a center hub 210 that will engage the selected sprocket ring 220' or 320' and fit the external spline on the output shaft 230. Next, the mating splines of the sprocket ring 220' or 320' and center hub 210 are slidingly engaged, and sprocket ring 220' or 320' and the peripheral flange 210a of the center hub 210 are joined by mechanical fasteners such as machine screws 207. Thereafter, sprocket assembly 200' is installed on the output shaft 230 and nut 235 is advanced and tightened with the required torque. Next, nut retainer 240 is placed over the nut 235, and openings 242 are positioned over threaded holes 244 to permit the installation of machine screws (not shown), which prevents the nut 230 from being loosened during operation.

Thus, it can be seen that the present invention provides an innovative rear belt drive system utilizing helical offset teeth to replace the rear belt drive on conventional belt driven motorcycles. The present belt drive system provides a plurality of selectively interchangeable pulleys or sprocket rings, which are assembled on a universal center hub. The interchangeable sprocket rings produce a wide range of final drive ratios for different motorcycle models and applications.

Although not specifically illustrated in the drawings, it should be understood that additional equipment and structural components will be provided as necessary and that all of the components described above are arranged and supported in an appropriate fashion to form a complete and operative Synchronous Belt Drive System for Motorcycles incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A rear belt drive system for modification of the final drive ratio transferred to the rear wheel of a motorcycle, said rear belt drive system comprising:
    a front sprocket assembly for attachment to the transmission output shaft, said front sprocket assembly including at least one interchangeable center hub including external connecting means formed thereon, at least one interchangeable sprocket ring having a predetermined number of teeth, said at least one interchangeable sprocket ring including internal connecting means formed therein for mating engagement with said external connecting means formed on said at least one interchangeable center hub, said center hub including a peripheral flange member disposed in overlapping relation to said sprocket ring, wherein internally threaded apertures formed in said peripheral flange member receive threaded fasteners extending through said sprocket ring to detachably secure said center hub to said sprocket ring, said at least one interchangeable sprocket ring further including a plurality of annular rows of obliquely angled teeth spaced apart at regular intervals, wherein the spaces between said teeth define a plurality of annular rows of cavities, said front sprocket assembly further including a nut retainer attached to said sprocket ring by machine screws, wherein internally threaded holes formed in said sprocket ring receive said machine screws extending through said nut retainer to detachably secure said nut retainer to said sprocket ring;
    a rear sprocket attached to the rear wheel of the motorcycle including a plurality of annular rows of obliquely angled teeth spaced apart at regular intervals, wherein the spaces between said teeth define a plurality of annular rows of cavities; and
    at least one continuous drive belt having a plurality of complimentary annular rows of obliquely angled teeth formed thereon for engagement within said cavities, said at least one continuous drive belt being disposed about and engaging said front sprocket assembly and said rear sprocket such that the final drive ratio transferred to the rear wheel is modified by selective combination of said at least one interchangeable sprocket ring and said at least one continuous drive belt.

2. A rear belt drive system of claim 1 wherein said teeth formed on said at least one interchangeable sprocket ring, said rear sprocket, and said at least one continuous drive belt respectively extend obliquely to the longitudinal direction such that said teeth formed on said at least one interchangeable sprocket ring, said rear sprocket, and said at least one continuous drive belt respectively are positioned at oppositely balanced angles and the centerlines thereof are offset from each other by a distance from 10% to 90% of the tooth pitch.

3. A rear belt drive system of claim 2 wherein said oppositely balanced angles range from 15 to 45 degrees.

4. A rear belt drive system of claim 1 wherein said connecting means include mating internal and external splines.

5. A rear belt drive system of claim 1 wherein said annular rows of obliquely angled teeth are separated by an annular groove formed along the mid-circumferential plane of said sprocket ring, said rear sprocket, and said belt.

6. A synchronous belt drive system for modification of the final drive ratio delivered to the rear wheel of a motorcycle, said belt drive system comprising:
    a front sprocket assembly for attachment to the transmission output shaft including at least one interchangeable center hub having an external spline formed thereon, a plurality of interchangeable sprocket rings each having a different number of teeth, said plurality of interchangeable sprocket rings further including an internal spline formed therein for mating engagement with said external spline on said at least one interchangeable center hub, said center hub including a peripheral flange member disposed in overlapping relation to each of said sprocket rings, wherein internally threaded apertures formed in said peripheral flange member receive threaded fasteners extending through said sprocket rings to detachably secure said center hub to said sprocket rings, said plurality of sprocket rings each including two annular rows of obliquely angled teeth spaced apart at regular intervals such that said teeth are positioned at oppositely balanced angles and the centerlines thereof are offset from each other by a distance from 10% to 90% of the tooth pitch, wherein said front sprocket assembly further includes a nut retainer attached to said sprocket rings by machine screws, wherein internally threaded holes formed in said sprocket rings receive said machine screws extending through said nut retainer to detachably secure said nut retainer to said sprocket rings;
    a rear sprocket attached in concentric relation to the rear wheel of the motorcycle also including two annular rows of obliquely angled teeth spaced apart at regular intervals such that said teeth are positioned at oppositely balanced angles and the centerlines thereof are offset from each other by a distance from 10% to 90% of said tooth pitch; and
    at least one continuous drive belt having complimentary rows of obliquely angled teeth formed thereon, said at least one continuous drive belt being disposed around and engaging said front sprocket assembly and said rear sprocket such that the final drive ratio transferred to the rear wheel is modified by selective combination of said plurality of sprocket rings and said at least one continuous drive belt.

7. A synchronous belt drive system of claim 6 wherein said oppositely balanced angles range from 15 to 45 degrees.

8. A synchronous drive belt system of claim 6 wherein said annular rows of angled teeth are separated by an annular groove formed along the mid-circumferential plane of said sprocket ring, said rear sprocket, and said belt.

9. A rear belt drive system for modification of the final drive ratio delivered to the rear wheel of a motorcycle, said rear belt drive system comprising:

a front sprocket assembly for attachment to the transmission output shaft, said front sprocket assembly including at least one interchangeable center hub having external connecting means formed thereon, a plurality of interchangeable sprocket rings each having a different number of teeth, said plurality of interchangeable sprocket rings also having internal connecting means formed therein for mating engagement with said at least one interchangeable center hub, said center hub including a peripheral flange member disposed in overlapping relation to each of said sprocket rings, wherein internally threaded apertures formed in said peripheral flange member receive threaded fasteners extending through said sprocket rings to detachably secure said center hub to said sprocket rings, said plurality of interchangeable sprocket rings each including an annular row of teeth disposed in perpendicular relation to the mid-circumferential plane of said plurality of interchangeable sprocket rings and spaced apart at regular intervals, wherein the spaces between said teeth define an annular row of cavities, wherein said front sprocket assembly further includes a nut retainer attached to said sprocket rings by machine screws, wherein internally threaded holes formed in said sprocket rings receive said machine screws extending through said nut retainer to detachably secure said nut retainer to said sprocket rings;

a rear sprocket attached to the rear wheel of the motorcycle including an annular row of teeth disposed in perpendicular relation to the mid-circumferential plane thereof and spaced apart at regular intervals, wherein the spaces between said teeth define an annular row of cavities; and at least one continuous drive belt having a complimentary row of teeth formed thereon and spaced apart at said regular intervals for engagement within said cavities, said at least one continuous drive belt being disposed about and engaging said front sprocket assembly and said rear sprocket such that the final drive ratio transferred to the rear wheel is modified by selective combination of said plurality of interchangeable sprocket rings and said at least one continuous drive belt.

10. A rear belt drive system of claim 9 wherein said connecting means include mating internal and external splines.

* * * * *